July 2, 1963

J. B. LONG 3,096,082

BORING TYPE CONTINUOUS MINER

Filed Jan. 5, 1961

INVENTOR
JOHN B. LONG

BY
ATTORNEYS

July 2, 1963   J. B. LONG   3,096,082
BORING TYPE CONTINUOUS MINER
Filed Jan. 5, 1961   6 Sheets-Sheet 4

INVENTOR
JOHN B. LONG
BY
ATTORNEYS

July 2, 1963  J. B. LONG  3,096,082
BORING TYPE CONTINUOUS MINER
Filed Jan. 5, 1961  6 Sheets-Sheet 6

INVENTOR
JOHN B. LONG 3,096,082
BORING TYPE CONTINUOUS MINER
John B. Long, Oak Hill, W. Va., assignor to Marmon-Herrington Company, Inc., Indianapolis, Ind., a corporation of Indiana
Filed Jan. 5, 1961, Ser. No. 80,927
9 Claims. (Cl. 262—9)

This invention relates to continuous miners that are particularly adapted for use in mining and the like, for dislodging the mineral of a solid vein and conveying the dislodged material to a suitable delivery point in a substantially uninterrupted flow.

Continuous miners previously provided have been notoriously lacking in a cooperative relationship between the devices used for the dislodging of material and the gathering and conveying means for delivering the material to a desired point. Such miners have usually provided for the dislodging of the material so that it fell to the ground floor whereupon on the advance of the miner to a new position of dislodgment the material on the ground floor would be scooped into position for conveying to the point of delivery.

The primary object of this invention is the provision of a continuous miner having cooperatively positioned cutting means and gathering means whereby the gathering means serves to dislodge cut material from the solid vein and to continuously provide for the direct loading of the dislodged material onto a conveying means for delivery to a given point.

A further object is the provision of a continuous miner having cooperatively positioned gathering means and cutting means, wherein the cutter means is of an improved construction that will facilitate dislodgment of material from a solid vein by the gathering means.

A further object is the provision of an improved method of continuous mining for removing material for the entire width of a room or entry.

Other objects and advantages of the invention will be apparent during the course of the following detailed description, taken in connection with the accompanying drawings, forming a portion of this specification and in which drawings.

In the drawings, wherein for the purpose of illustration is shown a preferred embodiment of the invention, and wherein similar reference characters designate corresponding parts throughout the several views, the letter A may generally designate the main frame means of my improved continuous miner, including drive means B; C my improved loading means including cooperatively positioned cutting means D and gathering means E; F the conveying means of my continuous miner including articulative tail means G; H the main hydraulic system of my improved continuuous miner, and I the variable speed hydraulic system.

It is to be noted that the various conduits of hydraulic circuitry have been omitted in all views except those diagrammatically illustrating such circuitry inasmuch as these conduits would only serve to further complicate and render indistinct structural characteristics.

Main frame means A preferably includes a pair of side frames 20 and 21 and suitable cross braces 22. The provision of sufficient cross braces 22 to provide a rigid frame for the continuous miner is well known in the art and only a single one of these cross braces has been shown, in order not to detract from the other details of the invention.

In order to provide for mobility of the continuous miner a track 24 is mounted upon sprockets 25 adjacent each of the ends of the frames 20 and 21, as is well known in the art.

The drive means B preferably includes a motor 27 driving at one end thereof a pump 28 which furnishes hydraulic fluid pressure to the main portion of the hydraulic system, as will be subsequently described. The motor 27 is coupled at the other end thereof to a main drive transmission 30 having a hydraulic clutch 31 for actuation thereof. The particular continuous miner shown in the drawings is designed for use in a coal mine and will ordinarily be supplied with direct current, and is therefore provided with a conventional starter 32, circuit breaker 33 and a conventional push button panel 35 for regulating, starting, stopping, forward and reverse movement of the motor 27. The electrical circuitry for this type of motor is well known in the art.

Two sets of tramming transmissions 37 and 38 are provided, the tramming transmissions 37 being provided for fast maneuvering and positioning, such as when the miner is to be moved about in the mine and positioned adjacent the face that is to be cut, and the transmissions 38 being provided for penetration of the solid vein during the mining operation.

The tramming transmissions 37 are each driven by the main drive transmission 30 through the power take-off means 40, and drive the head crawl sprocket 25 through power take-off means 42. These transmissions 37 have a fixed tramming speed for both forward and reverse motion.

The power supply for each of the transmissions 38 preferably includes a hydraulic motor 43 driven through interconnection with the cutting means D, as will be subsequently described. Each of the motors 43 drives a gear reducer 44 which has power take-off means 45 for driving the transmission 38. Power take-off means 47 interconnects each of the transmissions 38 with one of the crawl sprockets 25. Inasmuch as each of these transmissions 38 is driven through interconnection with the cutting means D, through hydraulic circuitry, the speed thereof may be accurately varied for penetrating the vein as required by vein variations.

One of the transmissions 37, a pump 43, a reducer 44, and a transmission 38 is preferably mounted upon each of the side frames 20 and 21, the motor 27 being supported therebetween upon braces 48 and the main transmission 30 being supported therebetween by braces 49.

Bracket frames 50 supporting hydraulic cylinders 51 may be provided adjacent each of the transmissions 38, the hydraulic cylinders 51 being interconnected to the conveying means F for height adjustment thereof; bracket frames 52 supporting hydraulic cylinders 53 may be provided adjacent each of the transmissions 37, the hydraulic cylinders 53 being interconnected to the gathering means E for height adjustment thereof; and pivot sleeve frame means 54 supported upon braces 49 may be provided adjacent the main transmission 30, for pivotally supporting the gathering means E.

A pivot axle 55 may be supported upon the main frame means A for pivotally suporting the cutting means D; a pivot bracket 56 may be supported upon the main frame means A for pivotally supporting the conveying means F; ground floor engageable hydraulic cylinders 57 may be mounted upon the main frame means A for tilting thereof; and hydraulic cylinders 58 may be supported upon the main frame A and interconnected to the cutting means D for height adjustment of the cutting means D.

The starter 32, circuit breaker 33, a main hydraulic oil reservoir 60, the push button panel 35, and hydraulic valve bank bracket 61 may also be mounted upon the main frame A.

Cutting means D preferably includes a frame 62, drive means 63, cutting drum means 64, and cutting chain means 65.

The frame 62 preferably includes a pair of side supports 67 and 68, one end of which is interconnected to pivot axle 55, the other end thereof being provided with a transverse brace 70. The transverse brace 70 is provided at the forward end thereof with spaced apart upper guide plates 72 and lower spaced apart guide plates 73, the upper guide plates 72 receiving the upper reach of the cutting chain means 65 therebetween and guiding the same in a cutting relationship between the drum means 64 and the guide plates 73 receiving the lower reach of the cutting chain means 65 therebetween and guiding the same in a cutting relationship between the cutting drum means 64. Guide plates 72 and guide plates 73 are provided with spaced apart cutting blades 75 extending between the upper and lower reaches of the cutting chain means 65, for a purpose which will be subsequently described.

Drive means 63 preferably includes a pair of cutting motors 77 and 78, one of which is mounted upon the side support 67 of the frame 62 and the other of which is mounted upon the side support 68 of the frame 62. For the purposes of this disclosure the motor 77 may be referred to as the right hand cutting motor and the motor 78 referred to as the left hand cutting motor. Both of the motors 77 and 78 are preferably electrically driven through an electric circuit including the push button controls 35, circuit breaker 33, and starter 32. Such circuitry is conventional and well known in the art.

Each of the motors 77 and 78 are interconnected to drive a first planetary gear reducer 80 which is coupled, by means of universal joint 81, to a second planetary gear reducer 82. Each of the planetary gear reducers 82 are provided with a shaft 83 which drives the cutting drum means 64.

The motor 77 also drives a pump 85 which is interconnected to the hydraulic motor 43, providing a direct relationship between the cutting means D and the tramming of the miner during the cutting operation. A hydraulic fluid reservoir 86, for providing fluid to the hydraulic circuitry interconnected with the pump 85 may be mounted upon the side support 67.

The motor 78 may drive a water pump 87 mounted upon the side support 68, which motor pump 87 provides a spray of water through the nozzle 88 adjacent the cutting chain drive means for reducing dust during the cutting operation.

Head lights 86 may be mounted upon the frame 62 for illumination of the working face.

Cutting drum means 64 preferably include a pair of spaced apart cutting drums 90 and 91. For the purposes of this disclosure, the cutting drum 90 may be referred to as the right hand cutting drum and the drum 91 referred to as the left hand cutting drum.

The right hand cutting drum 90 is provided with assembly bracket 93 for interconnection to the shaft 83 of the planetary gear reducer 82 driven by the right hand motor 77. The end of the cutting drum 90 opposite the bracket 93 is provided with a plurality of bit receiving sockets 94 into which removable bits 95 are secured. A secondary drum 96 may be provided extending outwardly about the outer periphery of the main drum 90, which secondary drum 96 is provided with bit receiving sockets 97 that receive removable bits 98 therewithin. A sprocket 99 is fixedly secured to the cutting drum 90, which sprocket meshes with and drives the cutting chain means 65.

The cutting drum 91 is substantially identical to the cutting drum 90, the same having a mount 93' which is secured to the shaft 83 of the planetary gear reducer 82 driven by the motor 78, and including bit receiving sockets 94', removable bits 95', a secondary drum 96', bit sockets 97', and removable bits 98'.

The cutting drum 91 is likewise provided with a sprocket 99' about which the cutting chain means 65 is entrained, however the sprocket 99' is supported upon the drum 91 by a roller bearing 100, so that this sprocket 99" freely rotates about the drum 91, serving merely as an idler for the cutting chain means 65. Such interconnection is provided so that the right hand cutting motor 77 provides all of the power for rotation of the cutting chain means 65 and the left hand motor 78 drives the cutting drum 91, which drive relationship is provided for a purpose that will become evident upon subsequent disclosure of the method of mining utilized with this apparatus.

Bits 101 may be provided upon the forward end of the coupling means 93 and 93' of the drums 90 and 91, for clearing the central area of the drums.

Cutting chain means 65 preferably include chain means 103 entrained about the respective sprockets 99 and 99', with the upper reach thereof extending through the guide provided by plates 72 and the lower reach thereof extending through the guide provided by the lower plates 73. The chain means 103 is provided with a plurality of bits 104 which extend in diverse angles therefrom, as is well known in the art.

The gathering means E preferably includes a gathering head 110, gathering arms 111, and drive means 112 therefor.

The gathering head 110 preferably includes a sloping frame 115 having at one end thereof a bracket 116 pivotally secured to the pivot sleeve frame means 54 so that the head 110 may be arcuately raised or lowered with respect to the main frame means A. The opposite end of the frame 115 is tapered to provide a ground contacting portion 118 which may extend below, but adjacent the cutting chain means 65.

Gathering head crank discs 120 and 121 are mounted in a spaced apart relationship upon the gathering head frame 115 for support of the gathering head arms 111, as will be subsequently described. The gathering head crank discs 120 and 121 are freely rotatable with respect to the frame 115 and are driven by the gathering head drive means 112, as will be subsequently described.

Also mounted on the frame 115, adjacent each of the gathering head crank discs 120 and 121 are guide block pivot pin assemblies 122 which cooperate with the gathering head crank discs in operation of the gathering arms 111, as will be subsequently described.

There are preferably provided two spaced apart gathering arms 111, disposed to either side of the gathering head 110. Each of the gathering arms 111 include an upper arm portion 125 and a lower arm portion 126. The upper arm portion 125 is preferably of a channel formation defining a guideway 127 which receives the gathering head pivot pin assembly 122 slidably therewithin. The lower arm portion 126 is provided with a socket 128 into which is received the gathering arm extension 129. The gathering arm extension 129 may be secured within the socket 128 as by locking pin 130. Teeth 131 may be provided along the uppermost portion of the gathering arm extension 129 for interaction with the cutting head in dislodging cut material. The lower arm portion 126 is provided with a hub portion 132 which receives a roller bearing 133 for the mounting of the gathering arms upon the drive lugs 135 of the gathering head crank discs 120 and 121.

Figures 5, 8:
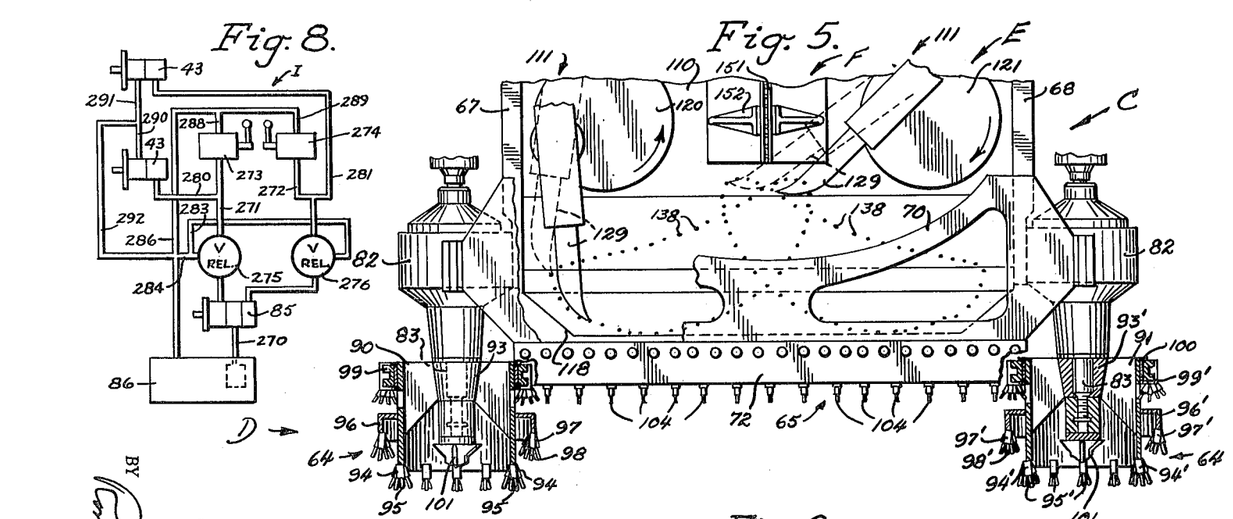
FIG. 5 is an enlarged top plan view of a fragment of the gathering means and cutting means of my improved continuous miner, with parts thereof broken away to disclose preferred details.
FIG. 8 is a diagrammatic view of the variable speed tramming hydraulic system of my continuous miner.
Figure 6:
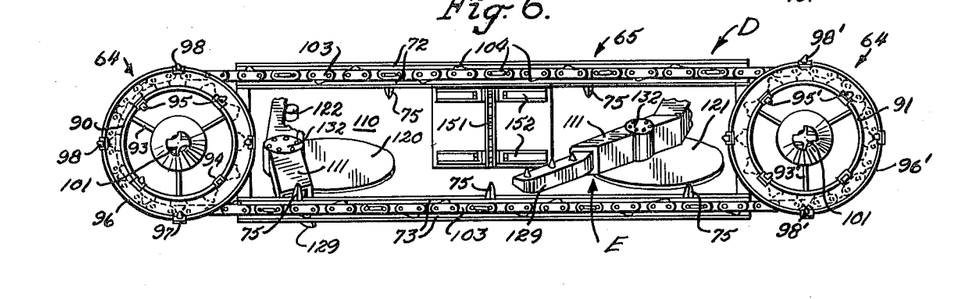
FIG. 6 is a front view of my improved continuous miner, with parts thereof broken away to disclose preferred details.

Upon rotation of the respective gathering head crank discs 120 and 121, as shown in FIG. 5, the gathering arm extensions 129 will move in their respective paths substantially as indicated by the dots 138, the cooperative relationship between the mounting of the gathering arms 111 on each drive lug 135 and the sliding relationship of the pin 122 within the channel 127 of each gathering arms 111 moving each of the arms in a gathering relationship. By looking at FIG. 10 it becomes obvious that this camlike alternate movement of the gathering arms 111 will cause first one arm and then the other to come in contact with the cut extension of the work face providing a wedge-like knocking force, first upon one side and then upon the other, which will fracture this projection and dislodge the same from the main work face whereupon the gathering arms will, in continued gathering and knocking motion, move the dislodged material in position upon the conveying means F.

Figure 3:
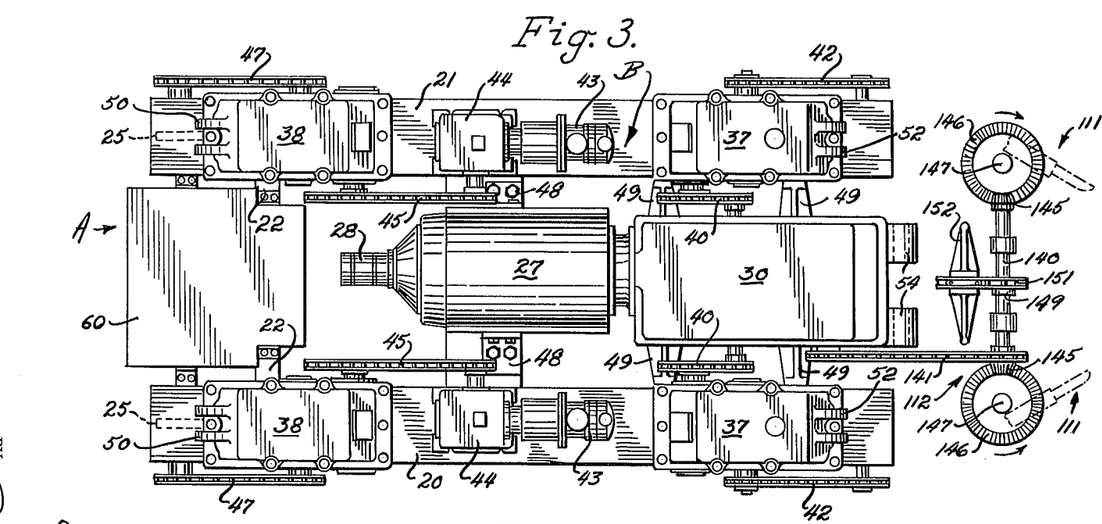
FIG. 3 is a top plan view of the basic frame of my improved continuous miner showing details thereof that are somewhat obscured by the conveying means in FIG. 1.
Figure 4:
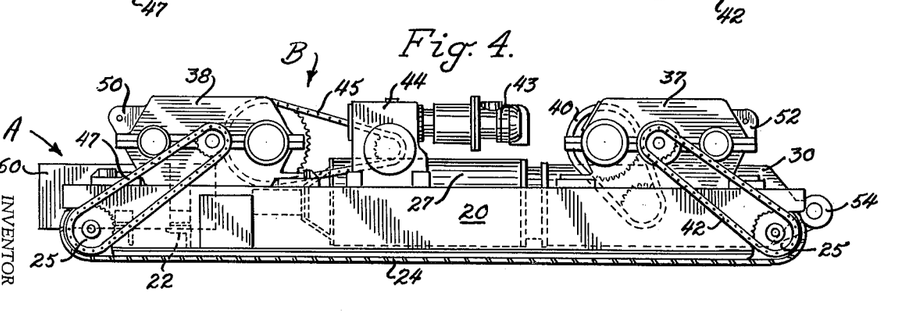
FIG. 4 is a side elevation of the basic frame of FIG. 3.

The drive means 112 is illustrated in FIG. 3, the same including a main shaft 140 mounted upon the frame 115 of the gathering head 110. Power take-off means 141 interconnects the shaft 140 to the main transmission 30, for rotation of the shaft 140. Bevel gear pinions 145 are provided at each end of the shaft 140, which pinions mesh with bevel gears 146 that are mounted upon drive shafts 147 which are interconnected with and provide the rotational force for the gathering head crank discs 120 and 121. In order to correlate the gathering action with the conveying means a sprocket 149, which drives the conveying means F, is provided upon the shaft 140.

The conveying means F preferably includes an endless conveyor 150 having a chain 151 and flights 152. The endless conveyor 150 is entrained substantially the length of the apparatus, being mounted upon and driven by sprocket 149 of shaft 140 mounted in the gathering head frame 115 and supported at the other end thereof upon idler sprocket 155 mounted in tail means G. The conveyor 150 extends through the frame 115 of the gathering head, along the length of the main frame means A, wherein side guide frames 156 and 157 are provided, and through the tail means G, about idler 155. The tail means G, side frames 156 and 157 and gathering head frame 115 define a trough-like passageway 160 for receiving the material to be conveyed.

A main conveying frame including side frames 156 and 157 provided with transversely extending braces (not shown) and a bottom plate 162 defining the lowermost portion of the passageways 160 for receiving material to be conveyed is provided, the same being well known in the art. This conveying frame 161 is pivotally supported in the pivot bracket 56 of the main frame A and hydraulic cylinders 51 interconnected therewith, so that the conveying frame 161 may be angularly raised or lowered with respect to the main frame A. Such angular adjustment is provided in order to provide proper discharge height of the conveyor for discharging onto various receiving conveyors or material loading devices of varying height.

The tail means G preferably comprises a horizontally swingable rear discharge conveyor frame 165 mounted upon disc 166 and secured to the conveyor frame 161 by pivot pin assembly 167, so that the discharge conveyor frame 165 is horizontally angularly adjustable with respect to the conveyor frame 161.

Flexible side guide plates 168 and 169 are provided for interconnecting the passageway 160 of the tail means G with the passageway 160 of the conveyor frame 162, forming a flexible discharge path for the conveyor. Hydraulic cylinders 170 and 171 may be provided to each side of conveyor 150, interconnecting the conveyor frame 162 and rear discharge frame 165.

Figure 1:
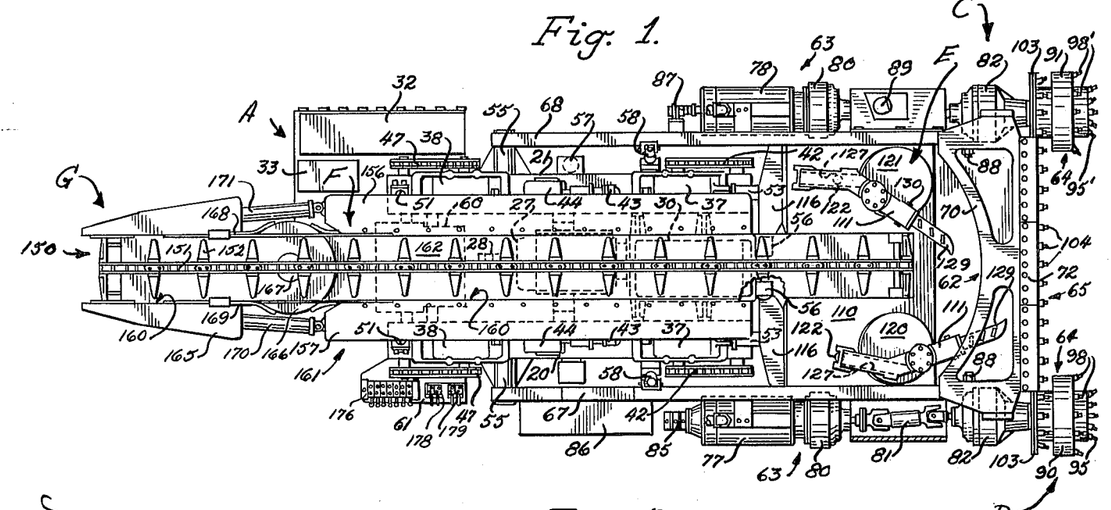
FIG. 1 is a top plan view of my improved continuous miner, with portions thereof broken away to disclose preferred details.
Figure 2:
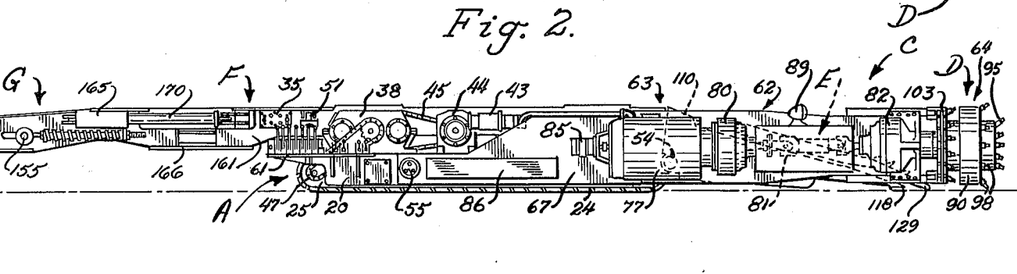
FIG. 2 is a side elevation of my improved continuous miner.
Figure 7:
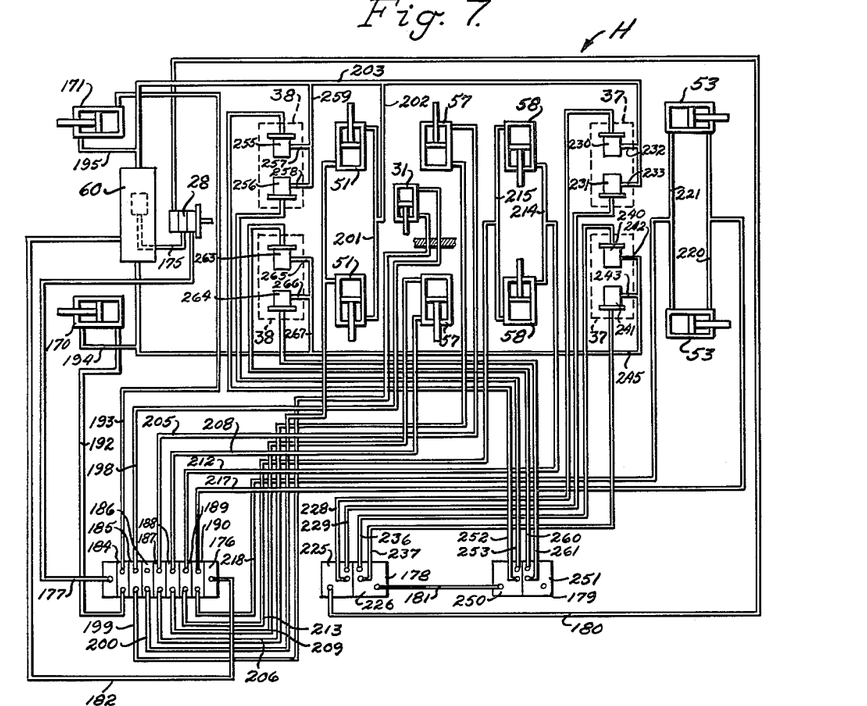
FIG. 7 is a diagrammatic view of the main hydraulic system of my continuous miner.

In the hydraulic system H the pump 28 is interconnected with the hydraulic fluid reservoir 60 by conduit 175; connected to the main valve bank 176 by conduit 177; and connected to secondary valve banks 178 and 179 by conduit 180, a conduit 181 being provided extending intermediate the valve banks 178 and 179. Main valve bank 176 is provided with a conduit 182 for return of fluid from the valve bank to the hydraulic tank 60. The valve banks 176, 178 and 179 are mounted on bracket 61, as shown in FIGS. 1 and 2.

The main valve bank 176 is provided with a plurality of valve sections 184, 185, 186, 187, 188, 189 and 190. The construction of a main valve bank having such a plurality of valve sections is conventional and well known in the art.

Valve section 184 is provided with a pair of conduits 192 and 193 leading to the hydraulic cylinders 170 and 171, respectively, for selective extension of these cylinders. The hydraulic cylinder 170 is provided with a return conduit 194 leading to the hydraulic tank 60, and hydraulic cylinder 171 is provided with conduit 195 leading to the hydraulic fluid tank 60. When the cylinder 170 is actuated fluid will flow under pressure through the conduit 192 and extend the piston thereof, fluid being drained from the forward portion of the cylinder 170 through the conduit 194, the rotation of the tail means G acting upon the cylinder 171 so that fluid is drawn into the forward end thereof through conduit 195 and discharged through the rearward end thereof through conduit 193, into the valve bank 176 and thence through conduit 182 into hydraulic fluid tank 60. Upon actuation of the cylinder 171 this process would be reversed.

The valve bank section 185 is provided with a pair of conduits 198 and 199 leading to the hydraulic clutch 31 of the main transmission 30. Such type of hydraulic clutch is well known in the art and will serve to actuate the main transmission 30 according to the elements that are to be driven therefrom.

Valve bank section 186 is provided with a conduit 200 leading to the right hand and left hand hydraulic lift cylinders 51 for raising and lowering the conveying means F. This conduit leads to the side of the cylinder providing for extension of the pistons and a conduit 201 interconnects the opposite ends of these cylinders, which conduit 201 opens into conduit 202 which, in turn, opens into conduit 203 leading to the hydraulic fluid tank 60. Upon extension of cylinders 51 fluid under pressure is provided from the valve bank section 186 through conduit 200, into the cylinders 51, fluid being discharged from the other end thereof to the conduits 201, 202 and 203 into the hydraulic fluid valve tank 60. When it is desired to lower the cylinder the weight thereof is utilized to force the pistons of the hydraulic cylinders down, drawing hydraulic fluid into the cylinders through the conduits 203, 202 and 201, and discharging hydraulic fluid therefrom through conduit 200, valve bank 176 and conduit 182 to the hydraulic fluid tank 60.

Hydraulic valve bank section 187 is provided with conduits 205 and 206 leading to the hydraulic cylinder 57 mounted on the left hand side of the main frame A.

This cylinder can be extended to angularly tilt the main frame A to the right, in which case fluid would be supplied under pressure through the conduit 206 and drain from the opposite end of the cylinder 57, through conduit 205. When the cylinder is retracted, the cycle of the fluid flow in the conduits is reversed.

Hydraulic valve bank section 188 is provided with conduits 208 and 209 for supplying hydraulic fluid under pressure to the hydraulic cylinder 57 mounted on the right hand side of the main frame A. This cylinder can be extended for tilting the main frame A to the left. When it is desired to actuate this cylinder and to tilt the main frame A, fluid pressure is supplied through conduit 209 and drained from the other end of the hydraulic cylinder 57 through conduit 208. When it is desired to lower the main frame A fluid flow through the conduits is reversed.

Hydraulic valve bank section 189 is provided with conduits 212 and 213, the conduit 212 leading into a conduit 214 interconnecting hydraulic cylinder 58 and conduit 213 leading into conduit 215 interconnecting the opposite ends of cylinders 58 from the conduit 214. When it is desired to raise the cutting frame 62, valve bank section 189 is actuated to supply fluid under pressure through conduit 213 and into conduit 215, extending the pistons of the respective cylinders 58, fluid being discharged from the opposite ends of the cylinders 58 through conduits 214 and 213 and into the main valve bank 176, and thence through conduit 182 into hydraulic fluid tank 60. When it is desired to lower the main cutting frame 62, the flow through the conduits is reversed.

Hydraulic valve bank section 190 is provided with conduits 217 and 218, the conduit 217 leading into a conduit 220 interconnecting hydraulic cylinders 53 and the conduit 218 leading into conduit 221 interconnecting the opposite ends of the cylinders 53 from conduit 220. When it is desired to raise or lower the gathering head 110, hydraulic fluid under pressure is supplied through conduits 217 and 220, the fluid from the opposite end of cylinders 53 therefrom being discharged through conduits 221 and 218 into the main valve bank section 176, thence through conduit 182 to the hydraulic fluid tank 60. When it is desired to lower the gathering head 110, the flow of fluid through the conduits is reversed.

Secondary valve bank 178 is provided with sections 225 and 226.

Valve bank section 225 is provided with conduits 228 and 229, the conduit 228 leading to clutch 230 of the left hand tramming transmission 37, which clutch 230 actuates the forward drive of the transmission; and conduit 229 leading to hydraulic clutch 231 of the left hand tramming transmission 37 for actuating the reverse drive of this transmission. Clutches 230 and 231 are provided with conduits 232 and 233, respectively, which discharge into conduit 203 leading to the hydraulic fluid tank 60.

Valve bank section 226 is provided with a pair of conduits 236 and 237, the conduit 236 leading to the clutch 240 of the right hand tramming transmission 37 for actuating the reverse drive thereof; and conduit 237 leading to the hydraulic clutch 241 of the right hand tramming transmission 37, for regulating the forward drive of this transmission. A pair of conduits 242 and 243 lead into conduit 245 which provides for a return flow of fluid to the hydraulic tank 60.

As has been previously mentioned, the right hand and left hand tramming transmissions 37 are operated at a fixed speed by the main transmission 30 and the separate sets of clutches are provided for selective directional drive according to whether the apparatus is to be driven forwardly, in reverse, or turned.

Valve bank 179 is provided with valve bank sections 250 and 251. The valve bank section 250 is provided with a pair of conduits 252 and 253, the conduit 252 leading to hydraulic clutch 255 to the left hand tramming transmission 38, the hydraulic clutch 255 actuating the forward drive of left hand tramming transmission 38; and conduit 253 is interconnected to the hydraulic clutch 256 of the left hand tramming transmission 38, for actuation of the reverse drive of this transmission. Conduits 257 and 258 lead from clutches 255 and 256, respectively, and lead into conduit 259 which discharges into conduit 203 for return of fluid to the hydraulic fluid tank 60.

Valve bank section 251 is provided with conduits 260 and 261, the conduit 260 leading to hydraulic clutch 263 of the right hand tramming transmission 38, for actuating the reverse drive of this tramming transmission; and conduit 261 leads into hydraulic clutch 264 for actuating forward drive of this tramming transmission. Conduits 265 and 266 lead from hydraulic clutches 263 and 264, respectively, into conduit 267 which is interconnected with conduit 245 leading into the hydraulic fluid supply tank 60.

As has been previously mentioned, the right and left hand tramming transmissions 38 may be driven at variable speeds through pump 43 in accordance with the cutting penetration desired and the clutches 255 and 256 are provided for selective directional drive according to whether the apparatus is to be advanced, retracted or turned.

The variable speed hydraulic system I preferably includes a conduit 270 interconnecting the pump 85 with hydraulic fluid tank 86 and a pair of conduits 271 and 272 leading from the pump 85 to valves 273 and 274, respectively, there being provided a relief valve 275 in the conduit 271 and a relief valve 276 in the conduit 272. A conduit 280 is interconnected to conduit 271 for providing fluid under pressure to the right hand hydraulic motor 43, and a conduit 281 is interconnected with the conduit 272 for providing hydraulic fluid under pressure to the left hand hydraulic motor 43. The relief valves 275 and 276 are provided with respective conduits 283 and 284 which discharge into conduit 286 leading into the hydraulic fluid reservoir 86; the flow control valves 273 and 274 are provided with conduits 288 and 289, respectively, likewise discharging into the conduit 286; and the right hand hydraulic motor is provided with a conduit 290 and the left hand hydraulic motor provided with a conduit 291, each of which lead into conduit 292 which likewise discharges into conduit 286. The provision of the conventional flow controls 273 and 274 in this hydraulic system provide for accurate regulation of the fluid flow to each of the hydraulic motors 43 so they may be operated at various speeds. This provides for accurate correlation of the tramming relationship and the cutting action during penetration of a working face. The relief valves are provided so that excessive pressure will not exist in either of the conduits 271 and 272 if for instance, the tramming is impeded by an obstruction.

In operation, the motor 27 is started, driving the pump 28 and main transmission 30, and clutch 31 is manipulated by valve bank section 185 to drive the high speed tramming transmissions 37, the levers of valve bank 178 being manipulated to tram the apparatus in the proper direction, and the vehicle is trammed at a high rate of speed into juxtaposition with the working face; the levers of valve bank section 185 are manipulated to place the clutch 31 in neutral; the levers of either valve bank section 187 or 188 are manipulated to selectively tilt the main frame A to the desired transverse angle; the levers of valve bank section 186 are manipulated to position the conveying means F at the desired vertical height for discharge onto a load receiving means; the levers of valve bank section 184 are manipulated for rotating the tail means G to the desired angle; the levers of valve bank section 189 are manipulated to position the cutting frame 62 at the desired height; the levers of valve bank section 190 are manipulated to position the gathering head 110 at the desired height; the levers of valve bank section 185 are manipulated to position the clutch 31 for driving the conveying means F and gathering arms 111; motors 77 and 78 are started; and flow controls 273 and 274 are adjusted to give the desired degree of tramming in accordance with the penetration of the cutting means D.

Figure 9:
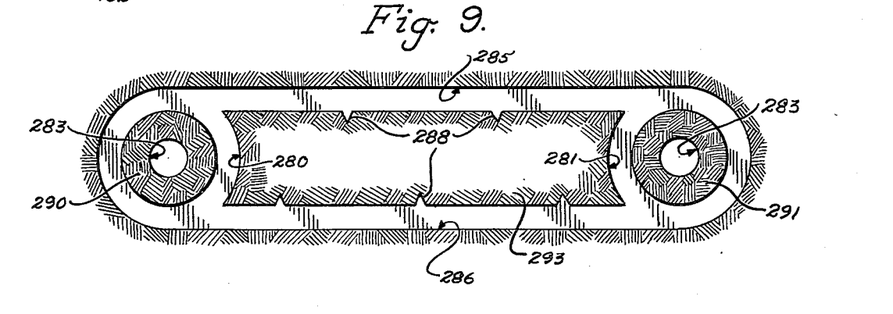
FIG. 9 is a front elevational view of a cut in a solid vein made by my continuous miner and showing the same in condition to be dislodged by the gathering means.

In the cutting operation the working face will be cut substantially as shown in FIG. 9, the same including a pair of spaced apart circular cuts 280 and 281 made by the cutting drum means 64, each of which includes a small inner cut 283 made by the bits 101; a pair of transversely extending cuts 285 and 286 extending between the circular cuts 280 and 281; and a plurality of grooved portions 288 spaced along the length of the cuts 285 and 286, the grooves 288 being cut by the cutting blades 75.

Figure 10:
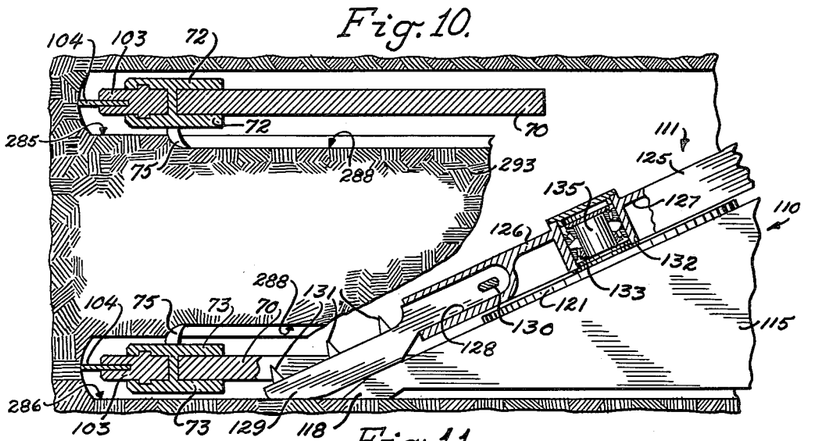
FIG. 10 is an enlarged longitudinal sectional view taken through a fragment of the cutting means and gathering means of my improved continuous miner and showing the cooperative relationship thereof in the dislodgment of material from a solid vein.

Such cutting action leaves a pair of cylindrical portions of material 290 and 291 within the cutting drum means 64, which portions will be dislodged by the brackets 93 and 93′ of the respective cutting drums, and an elongated block of material 293. The block 293 will, as the cut is extended, extend into position for abutment by the gathering arms 111, as shown in FIG. 10. When this block 293 extends into contact with the gathering arms 111, the abutment of the gathering arms against the block effect a wedge-like knocking action thereupon which will serve to break the block from the working face and, as the block is broken, the shattered portions thereof will be gathered by the gathering arms 111 and moved onto the conveying means F.

The grooves 288 provide weakened portions at spaced intervals along the block 293 which will foster lines of fracture when the block 293 is acted upon by gathering arms 111, providing facile dislodgment and breakage of the block 293 so that it is in condition for conveying.

Figure 11:
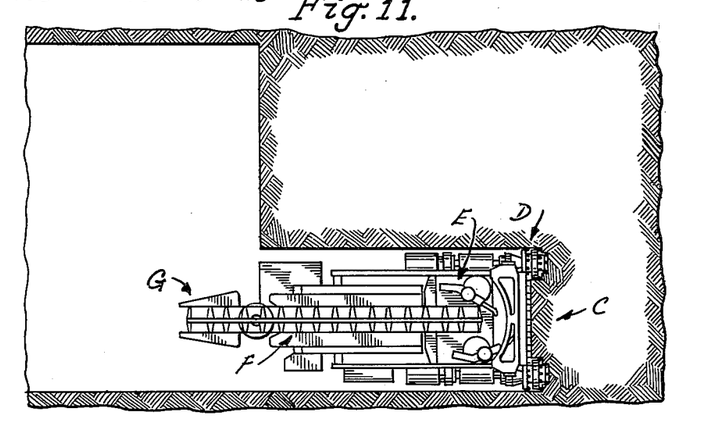
FIGS. 11, 12 and 13 are a series of views showing the respective steps in my improved method of mining the width of a room or entry.
Figure 12:
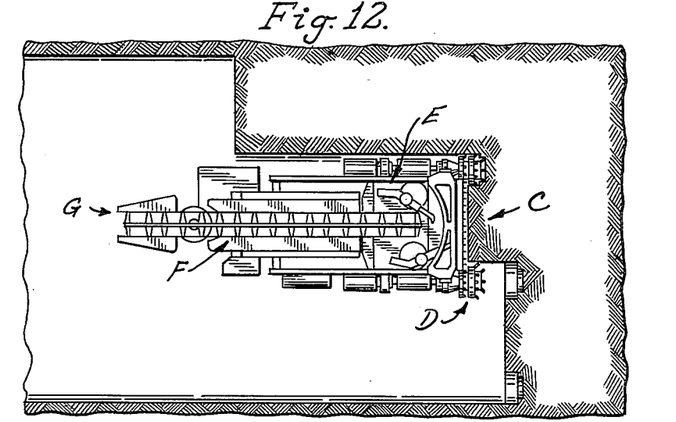
Figure 13:
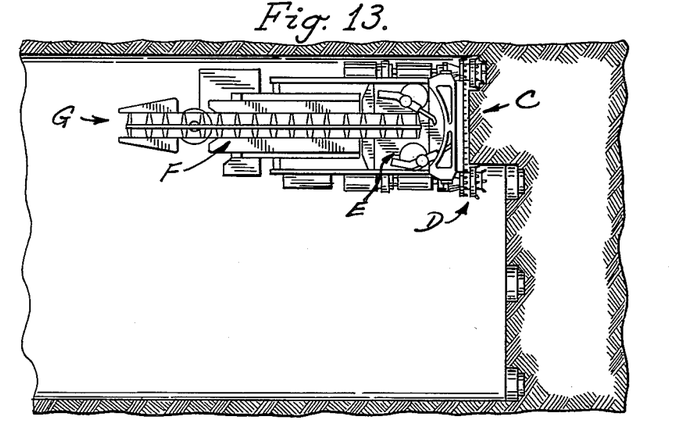

As shown in FIGS. 11, 12 and 13, the preferred method of mining the width of a room or entry is to begin at the extreme right hand side of the room or entry and to move thereacross from right to left. This method of mining is effective in realizing the full potential of the apparatus wherein, in the initial cut, as shown in FIG. 11, cutting drums 90 and 91 are both drilling into the working face, however, in FIGS. 12 and 13 cutting drum 90 is not in contact with the working face, so that the cuts of FIGS. 12 and 13 may be made substantially faster than the cut of FIG. 11. This is due to the fact that in FIG. 11 cutting drum 90, which also rotates the cutting chain means 65 must also drill into the working face, as will cutting drum 91. In subsequent passes, as shown in FIGS. 12 and 13, drum 90 is not in contact with the working face, so that the only load upon this drum is the rotation of the cutting chain means 65 and the load upon the drum 91 is solely the drilling penetration thereof.

Figure 14:
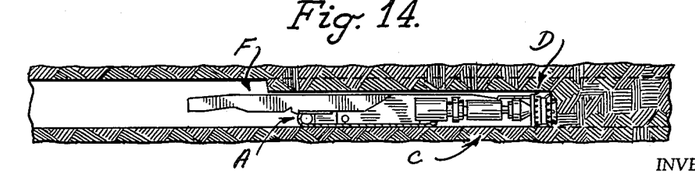
FIGS. 14 and 15 are side elevational views showing the steps in the method of mining a vein of a considerable height.
Figure 15:
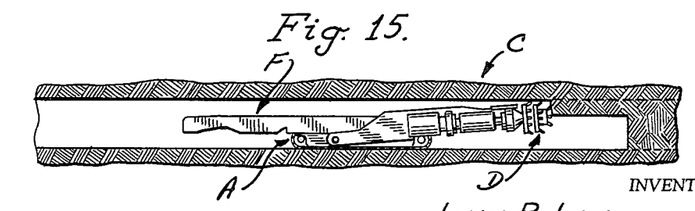

In FIGS. 14 and 15 I have shown my improved method of cutting seams of varying height, FIG. 14 illustrating the first pass at the lowermost portion of a seam, and FIG. 13 illustrating the pass at the upper level of the seam.

Various changes in the shape, size and arrangement of parts may be made to the form of the invention herein shown and described, without departing from the spirit of the invention or the scope of the following claims.

I claim:

1. In a continuous miner, the combination of a main frame; cutting means mounted upon said main frame; said cutting means including material dislodging means for making a pair of spaced apart cuts in a working face, material dislodging means for making a pair of spaced apart cuts in the working face interconnecting with the cuts made by said first mentioned material dislodging means, said first and second mentioned material dislodging means being cooperatively positioned for cutting penetration of a working face leaving a projection of material extending intermediate the cuts made by said first and second mentioned material dislodging means, and a plurality of blades mounted in a spaced apart position for scoring the projection of material extending from said working face along its side edges left by the cuts of said second mentioned material dislodging means; gathering means mounted upon said main frame and disposed in juxta-position with respect to said cutting means for cooperative abutment with the projection extending from the working face to dislodge such projection; and conveying means mounted upon said main frame in juxtaposition to receive the dislodged material.

2. The combination as specified in claim 1 wherein said gathering means is disposed in juxtaposition with respect to said conveying means for continuous cooperative dislodgment of the projection extending from the working face and movement of the dislodged material onto said conveying means.

3. Cutting means for a continuous miner including a first cutting drum and a second cutting drum, said first and second cutting drums being positioned in a spaced apart cutting relationship, a first sprocket fixedly secured to said first drum for cooperative rotation therewith, a second sprocket mounted upon said second cutting drum, said second sprocket being independently rotatable with respect to said second cutting drum, a cutting chain entrained about the said first and second sprockets and positioned in a cutting relationship with respect to said first and second cutting drums, first drive means for rotation of said first cutting drum and said cutting chain, and second drive means for rotation of said second cutting drum independently of the rotation of said first cutting drum and said cutting chain.

4. Cutting means as specified in claim 3 wherein guide means is provided for said cutting chain, said guide means including a plurality of spaced apart cutting blades extending therealong and projecting intermediate the reaches of said cutting chain.

5. A method of continuous mining with a continuous miner having a pair of spaced apart cutting drums and a cutting chain entrained about the cutting drums with one of the cutting drums driving the cutting chain and the other cutting drum operative independent of the cutting chain which includes the steps of making a first cut in the working face with each of the cutting drums and the cutting chain engaging the working face in a cutting relationship, making a second cut in the working face laterally of the first cut with the cutting drum operative independently of the cutting chain and the cutting chain engaging the working face in a cutting relationship and the cutting drum driving the cutting chain extending into the opening made by the first cut and substantially out of contact with the working face, and making succeeding cuts in the same manner as the second cut for the entire width of the area then being mined.

6. A method of continuously mining a place having an opening in the working face with a continuous miner having a pair of spaced apart cutting drums and a cutting chain entrained about the cutting drums with one of the cutting drums driving the cutting chain and the other cutting drum operative independent of the cutting chain which includes the steps of making a cut in the working face adjacent the opening with the cutting drum operative independently of the cutting chain and the cutting chain engaging the working face in a cutting relationship and the cutting drum driving the cutting chain extending into the opening of the working face, and making succeeding cuts with the cutting drum operative independently of the cutting chain and the cutting chain engaging the working face in a cutting relationship and the cutting drum driving the cutting chain extending into the opening in the working face made by the preceding cut for the entire width of the area then being mined.

7. In a continuous miner, the combination of a main frame; loading means mounted upon said main frame, said loading means including cutting means for engaging a working face and making a cut therein defining a projection of substantial transverse dimension extending from the working face, said cutting means including a first cutting drum and a second cutting drum, said first and second cutting drums being positioned in a spaced apart cutting relationship, means for rotatably mounting said first and second cutting drums upon said main frame, a first sprocket fixedly secured to said first drum for cooperative rotation therewith, a second sprocket mounted upon said second cutting drum, said second sprocket being independently rotatable with respect to said second cutting drum, a cutting chain entrained about said first and second sprockets and positioned in a cutting relationship with respect to said first and second cutting drums, first drive means mounted upon said main frame and operatively connected to said first cutting drum for rotation of said first cutting drum and said cutting chain, and second drive means mounted upon said main frame and operatively interconnected to said second cutting drum for rotation of said second cutting drum independently of the rotation of said first cutting drum and said cutting chain, and gathering means mounted upon said main frame and disposed in juxtaposition with respect to said cutting means for cooperative abutment with the projection extending from the working face to dislodge such projection; conveying means mounted upon said main frame, said gathering means being disposed in juxtaposition with respect to said conveying means for continuous cooperative dislodgment of the projection extending from the working face and movement of the dislodged material onto said conveying means; and drive means mounted upon said main frame for the advancement thereof and penetration of the working face.

8. Cutting means as specified in claim 7 wherein guide means is mounted upon said main frame and cooperatively contacts said cutting chain for guided movement thereof, said guide means including a plurality of spaced apart cutting blades extending therealong and projecting intermediate the reaches of said cutting chain.

9. A continuous miner including cutting means for making spaced apart vertically extending cuts in a working face and horizontally extending cuts in a working face interconnecting said vertically extending cuts, leaving a projection of substantial transverse dimension extending from the working face intermediate said cutting means, said cutting means including a plurality of spaced apart cutting blades positioned for scoring the horizontal faces of the projection extending from the working face; and gathering means positioned with respect to said cutting means for impingement thereof against the projection extending from said working face, said gathering means including a pair of spaced apart arms, drive means operatively interconnected to said arms for driving said arms for alternating opposed abutment of said arms against the projection extending from said working face, for dislodgement of the projection from the working face.

References Cited in the file of this patent

UNITED STATES PATENTS

| | | |
|---|---|---|
| 2,699,328 | Alspaugh et al. | Jan. 11, 1955 |
| 2,708,800 | Logus | May 24, 1955 |
| 2,733,057 | Letts | Jan. 31, 1956 |
| 2,734,731 | Cartlidge et al. | Feb. 14, 1956 |
| 2,758,825 | Wohlmeyer | Aug. 14, 1956 |
| 2,808,249 | Robbins | Oct. 1, 1957 |
| 2,823,024 | Hagenbook | Feb. 11, 1958 |
| 2,829,876 | Bailey | Apr. 8, 1958 |
| 2,866,626 | Moon | Dec. 30, 1958 |
| 2,916,273 | Cartlidge et al. | Dec. 8, 1959 |
| 2,967,701 | Wilcox | Jan. 10, 1961 |

OTHER REFERENCES

Hartenstein, German printed application, 1,005,913, April 11, 1957.